United States Patent [19]

Leitmann

[11] 4,326,096

[45] Apr. 20, 1982

[54] ELECTRICAL CONNECTOR

[75] Inventor: William J. Leitmann, Northbrook, Ill.

[73] Assignee: Hobson Bros., Inc., Chicago, Ill.

[21] Appl. No.: 123,032

[22] Filed: Feb. 20, 1980

[51] Int. Cl.³ .......................... H01R 4/48; H04N 5/65

[52] U.S. Cl. .......................... 174/84 R; 313/477 HC; 339/144 R; 358/245

[58] Field of Search ............... 174/84 C, 50.52, 50.53, 174/84 R; 313/477 R, 477 HC, 479; 358/245

[56] References Cited

U.S. PATENT DOCUMENTS 3,112,150 11/1963 Hammell ...................... 174/84 C X 3,992,569 11/1976 Hankins et al. .................. 174/76 X 4,191,973 3/1980 Szydlowski ................ 313/477 R X

*Primary Examiner*—Roy N. Envall, Jr.

*Attorney, Agent, or Firm*—Neuman, Williams, Anderson & Olson

[57] ABSTRACT

An electrical connector for use in a high-voltage circuit is provided. The connector includes a clip which is adapted to resiliently engage and make electrical contact with a terminal fixedly mounted on a surface; an electrical lead connected to the clip and extending therefrom; and a cover piece of insulative material accommodating said clip and the portion of the lead connected thereto. The cover piece has a section overlying a portion of the surface circumjacent the terminal. A filler of adhesive, rubberlike, insulative material is disposed within the interior of the cover piece and embeds therein the clip, the portion of the lead connected thereto, and the portion of the terminal engaged by the clip. The filler effects adherence of the cover piece to the surface portion circumjacent said terminal.

7 Claims, 10 Drawing Figures

FIG. 1
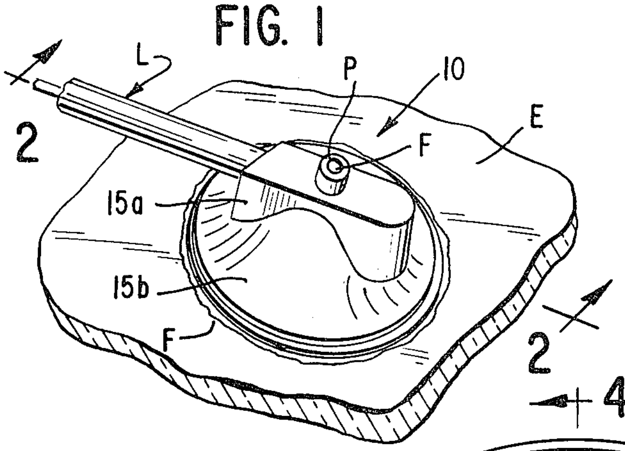
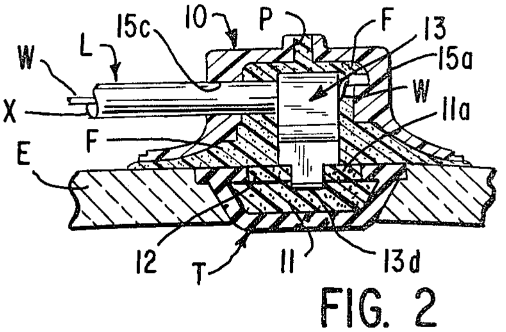
FIG. 2
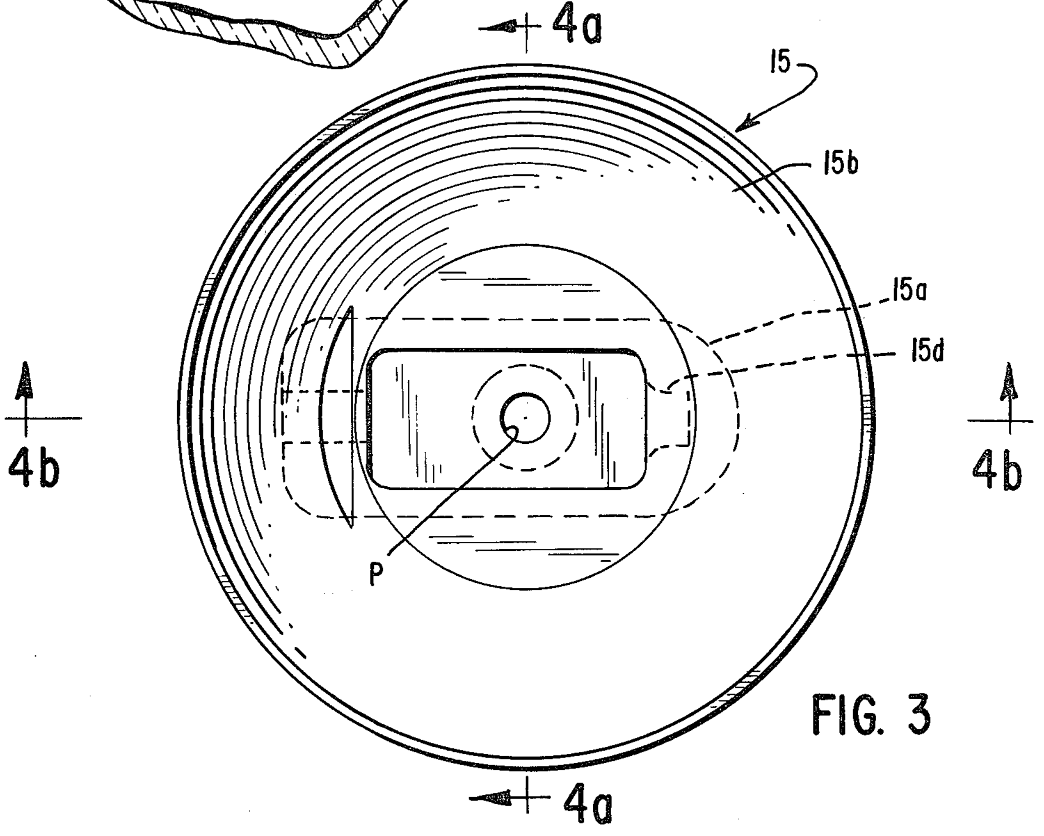
FIG. 3
FIG. 4a
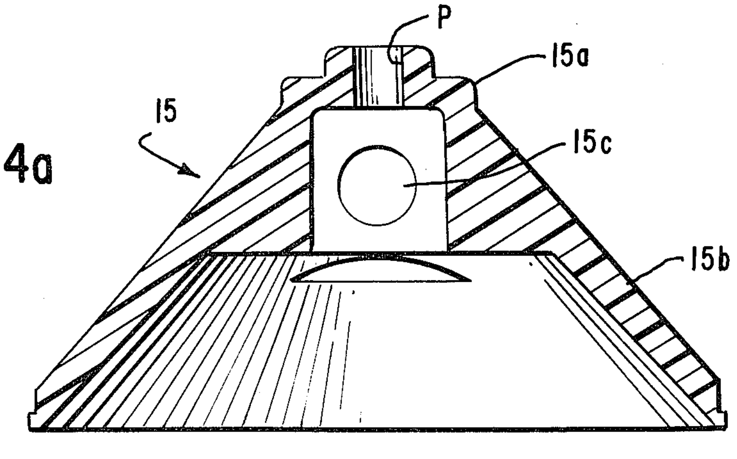

FIG. 7
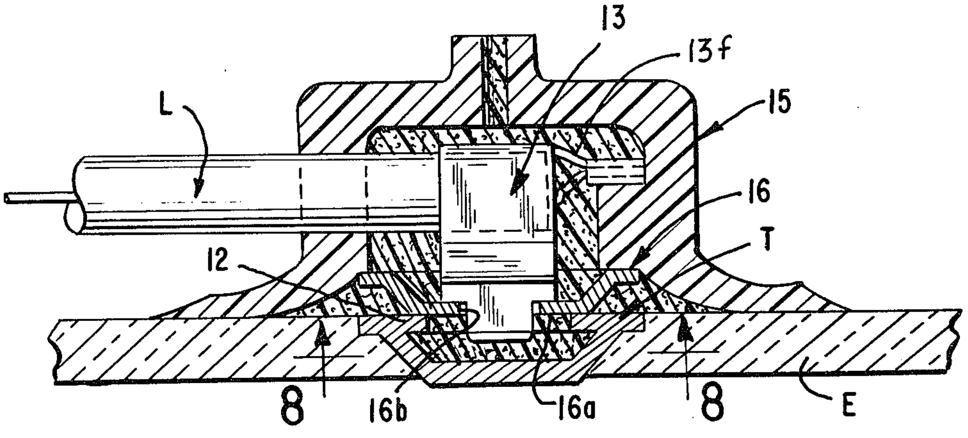
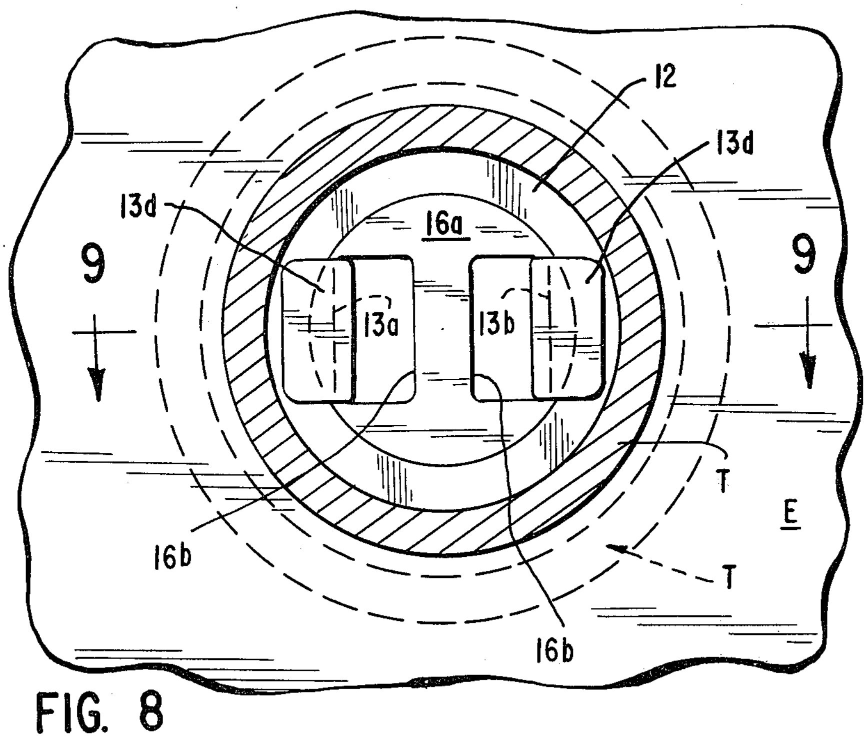
FIG. 8
FIG. 9
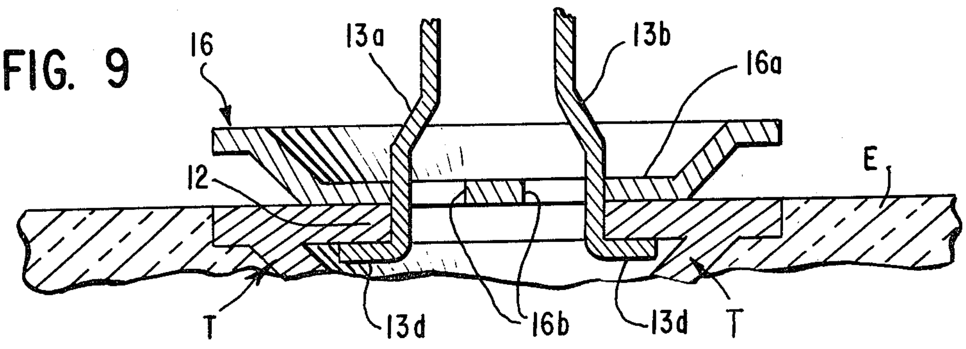

ELECTRICAL CONNECTOR

BACKGROUND OF THE INVENTION

In high-voltage circuits such as incorporated in projection-type television receivers or the like, serious electrical shock hazards and corona problems are frequently encountered with regard to the anode connector which engages the standard terminal fixedly mounted on the exterior of the picture tube. Furthermore, in such installations, making the proper electrical connection oftentimes is an awkward and difficult manipulation because of space limitations and obstruction by the receiver chassis or other components comprising the circuit.

SUMMARY OF THE INVENTION

Thus, it is an object of the invention to provide a connector which avoids shock hazards and corona problems when included in a high-voltage circuit.

It is a further object to provide an electrical connector which is of simple, inexpensive construction, and has a low profile when connected to a terminal.

It is a still further object to provide an electrical connector which will maintain a proper electrical contact with a terminal even when subjected to excessive vibrations.

It is a still further object to provide an electrical connector which may be readily assembled and disassembled with respect to a terminal or second connector.

Further and additional objects will appear from the description, accompanying drawings and appended claims.

In accordance with one embodiment of the invention, an electrical connector is provided which is particularly suitable for use in a high-voltage circuit. The connector includes a resilient clip which is adapted to make positive electrical contact with a terminal fixedly mounted on a surface. An insulated electrical lead is connected to the clip and extends therefrom. A cover piece of insulative material accommodates the clip and the portion of the lead connected thereto and has a section thereof overlying a portion of the surface circumjacent the terminal. The connection between the clip and electrical lead is concealed within the cover piece. A filler of adhesive, rubberlike, insulative material is disposed within the interior of the cover piece and embeds therein the clip, the portion of the lead connected thereto, and the portion of the terminal engaged by the clip. The filler effects adherence of the cover piece to the surface portion circumjacent the terminal.

DESCRIPTION

For a more complete understanding of the invention reference should be made to the drawings wherein:

FIG. 1 is a fragmentary perspective top view of one form of the improved electrical connector shown assembled with a terminal fixedly mounted on the exterior surface of a cathode ray tube or the like.

FIG. 2 is a fragmentary enlarged sectional view taken along line 2—2 of FIG. 1.

FIG. 3 is an enlarged bottom view of the cover piece per se.

Figure 4B:
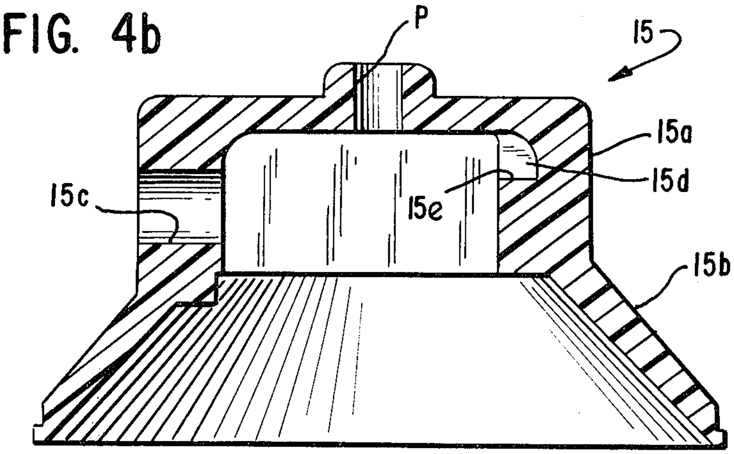

FIGS. 4*a* and 4*b* are sectional views taken, respectively, along lines 4*a*—4*a* and 4*b*—4*b* of FIG. 3.

Figure 5:
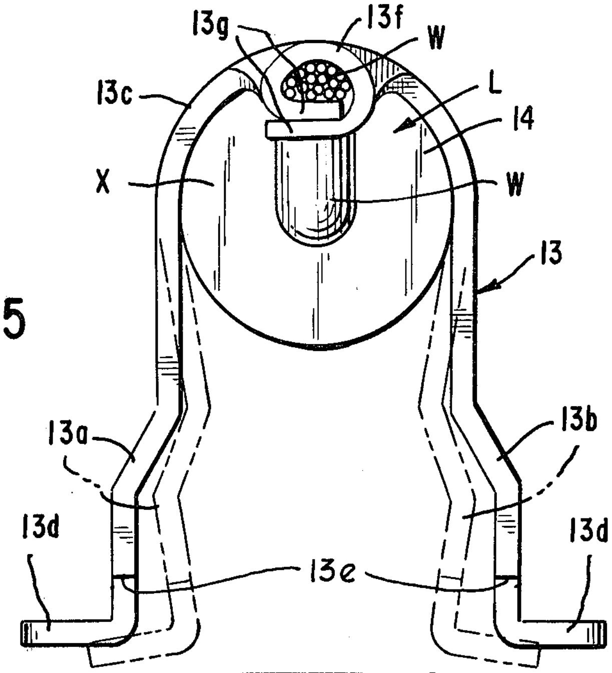

FIG. 5 is an enlarged end view of the clip and electrical lead connected thereto and shown removed from the cover piece and the terminal.

Figure 6:
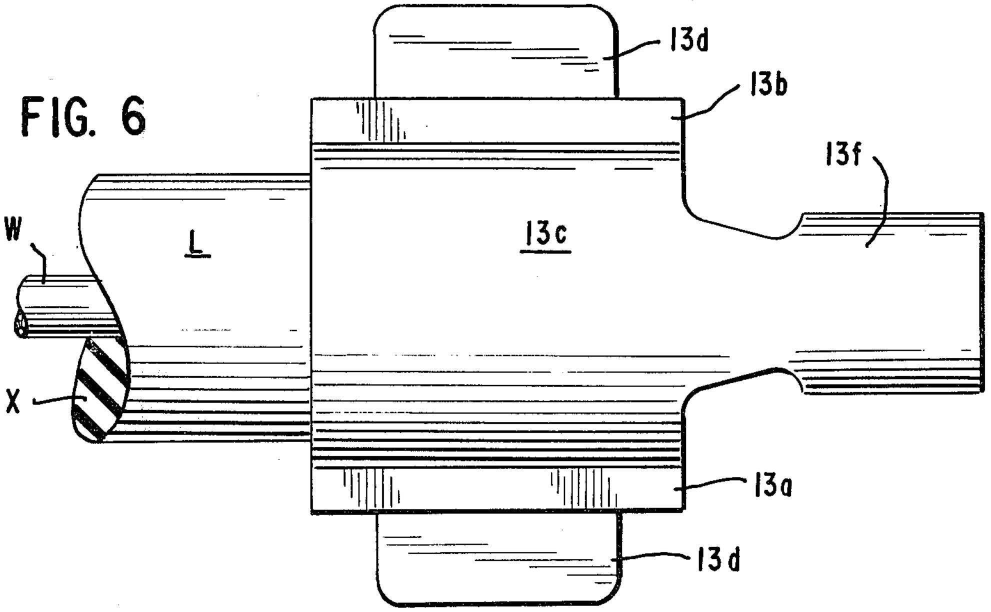

FIG. 6 is a top view of the clip and electrical lead of FIG. 5.

FIG. 7 is an enlarged fragmentary sectional view similar to FIG. 2 of a modified connector which incorporates an X-ray shield piece.

FIG. 8 is a fragmentary sectional view taken along line 8—8 of FIG. 7.

FIG. 9 is a fragmentary sectional view taken along line 9—9 of FIG. 8.

Referring now to the drawings and more particularly to FIGS. 1 and 2, one form of the improved connector 10 is shown in combination with a conventional terminal T fixedly mounted on or molded within the glass envelope E of a cathode ray tube or the like. The terminal T is of electrically conductive material and serves as an anode in high-voltage circuits. The terminal is provided with a recess 11 having an entry 11*a* thereto delimited by an inwardly-extending flange or lip 12. The exterior of the flange is substantially flush with the exposed surface of the envelope E.

Connector 10 includes a resilient clip 13 preferably of electrically conductive spring metal, see FIGS. 5 and 6, to which is fixedly attached one end 14 of a conventional insulated lead L, see FIG. 5. The clip 13 has protruding elements or leg portions 13*a*, 13*b* which have the distal ends 13*d* thereof offset outwardly in opposite directions. When the connector 10 is assembled with the terminal T, the distal ends 13*d* of the clip are inserted through the entry 11*a* of the terminal recess 11 and resiliently contact the terminal lip 12, in a manner to be described more fully hereinafter.

The opposite end of the lead L, not shown, is connected to a suitable high-voltage power source. In normal operation the connector 10 may be subjected to voltage in the magnitude of 60,000–80,000 volts or more.

Besides the clip 13 and lead end 14 connected thereto, connector 10 embodies a one-piece cover piece 15 preferably molded from a dielectric material (e.g., silicone rubber). The cover piece includes outer and inner sections 15*a* and 15*b* and the interior of section 15*a* accommodates the clip 13 and the lead end 14 connected thereto. The inner section 15*b* has a skirtlike configuration which flares outwardly from the outer section 15*a* towards the exposed surface E. The inner section 15*b* overlies and surrounds the entry 11*a* to terminal recess 11 and the portion of the envelope surface circumjacent the terminal, see FIG. 2.

The interior of the cover piece and the recess and entry of the terminal T are filled with a filler F of an adhesive, dielectric, rubberlike material (e.g., air-cured silicone rubber). A suitable port P is provided in the outer section 15*a* to permit the filler F to be injected into the interior of the cover piece when the connector 10 is assembled with the terminal T. The filler will completely fill the cover piece interior and embed the clip 13 and the portion of the electrical lead connected thereto and also will fill the recess 11, entry 11*a* and lip 12 of the terminal T. As seen in FIG. 1, a small amount of filler F may ooze out beneath the cover piece inner section 15*b* and thus, adhesively retain the latter against the exposed surface of the envelope E.

Clip 13, as seen more clearly in FIGS. 5 and 6, is formed of a resilient thin metallic material (e.g., copper) and includes an inverted u-shaped section having the leg portions 13a, 13b depending from a bail portion 13c. The lower distal end 13d of each leg portion is offset outwardly so as to effectively engage the underside of the lip 12 of the terminal T when the connector is assembled therewith, see FIG. 2. To facilitate assembly of the connector and the terminal, the leg portions 13a, 13b are squeezed together, as shown in phantom lines in FIG. 5, so that the ends 13d will clear the lip 12 and allow the distal ends 13d to pass through the entry 11a and into the recess 11 of the terminal T. Upon release of the leg portions 13a, 13b they will automatically spring outwardly and positively engage the lip and make good electrical contact therewith. A shoulder 13e is formed in each leg portion adjacent the distal end thereof. The shoulders engage the upper side of the lip when the ends 13d are in contact with the underside thereof and prevent rocking or tilting of the clip when the filler F is being injected into the cover piece interior, the recess and entry of the terminal T.

As will be observed in FIG. 5, there is a tonguelike member 13f which protrudes longitudinally from the bail portion 13c. Member 13f is provided with a pair of tabs 13g which embrace the wire core W of the insulated electrical lead L and cause said core to be crimped to the tonguelike member 13f and make electrical contact therewith. If desired, instead of crimping, the wire core can be connected to the clip member by soldering. As noted in FIG. 5, the bail portion 13c and leg portions 13a, 13b coact to effectively straddle the insulation X which surrounds the wire core W of the lead L.

The cover piece 15, as seen in FIGS. 4a and 4b, has the interior thereof shaped so as to conveniently accommodate the clip 13 and the lead end portion 14. Formed at one side of the outer section 15a is a passageway 15c which is sized so as to snugly and slidably engage the exterior of the portion of the lead L which extends from the clip 13. Opposite the inner end of passageway 15c and spaced axially therefrom is a pocket 15d in which the tonguelike member 13f of the clip is disposed when the clip is accommodated within the cover piece interior. The lower surface 15e of the pocket provides a shelf or ledge which subtends the clip member 13f and provides support therefor. Thus, the shelf 15e and the passageway P coact with one another to provide effective support on both sides of the accommodated clip.

The inner section 15b of the cover piece is initially flexible thereby enabling the lower edge thereof to conform substantially to the configuration of the surface surrounding the terminal T. The extent to which the leg portions 13a, 13b depend from the bail portion 13c is substantially less than the extent the inner section 15b normally depends from the outer section 15a of the cover piece. Thus, when the distal ends 13d of the clip are in locking engagement with the terminal lip 12, the inner section 15b will assume a substantially flattened distorted condition, as seen in FIG. 2. When in its distorted, substantially flattened condition, the inner section will exert a resilient force on the envelope surface E and urge the offset ends 13d of the clip to positively engage the underside of the lip. When the connector 10 is assembled with the terminal, the outer and inner section of the cover piece will protrude outwardly from the envelope surface E a minimal amount; thus, presenting a low profile. By reason of such a profile, the connector may be utilized in instances where only a minimal amount of space is available to accommodate the cathode ray tube and the anode connector.

As aforementioned, once the filler F has been injected into the interior of the cover piece, the filler embeds the clip, the electrical lead connected thereto, and the interior of the terminal and thus, prevents the connector from accidentally becoming disconnected from the terminal due to vibrations or the like. Furthermore, the filler prevents electrical shock hazards and corona from occurring when the connector is subjected to a voltage in the range of 60,000–80,000 volts.

In certain instances it is desirable or required that a means be provided for shielding X-rays which might be emitted from the terminal T. Such a shield piece 16 for this purpose is shown in FIGS. 7–9. The piece 16 has a saucerlike configuration and is formed of a suitable metallic material. As seen in FIG. 7, piece 16 overlies the exposed side of terminal T and is sandwiched between the terminal lip 12 and the shoulder 13e formed on leg portion 13a, 13b of the clip 13. The base 16a of the shield piece is provided with a pair of slots 16b through which the offset distal ends 13d of the clip 13 extend. The shoulder 13e of each leg portion 13a, 13b is spaced from the offset end 13d an amount substantially equal to the thicknesses of the terminal lip 12 and the base 16a of piece 16. The size of each slot 16b is such that it will allow the offset end 16d of the clip to pass therethrough and then permit the ends 16d to spring outwardly and engage the underside of the lip 12. As will be noted in FIG. 7, the diameter of piece 16 is such that the piece will completely overlie the exposed surface of the terminal.

In assembling the connector 10 and shield piece 16 with the terminal T, the clip 13 with the shield piece 16 in place is aligned with opening 11a to the recess 11 in the terminal and then the leg portions 13a, 13b are squeezed together a sufficient amount so as to permit the offset ends 13d to pass through the opening 11a. Once the ends 13d have cleared the underside of the terminal lip 12, the leg portions 13a, 13b are allowed to spring outwardly and positively engage the underside of the lip. The assembly of the clip leg portions and shield piece 16 with the terminal lip is done while the cover piece 15 is slid longitudinally along the lead L away from the clip so that the clip leg portions are exposed. Once the clip and shield piece are properly secured to the terminal lip, the cover piece 15 is then slid along the lead L in a direction towards the clip until the protruding portion 13f of the clip is disposed in supporting engagement with the ledge 15e formed in the interior of the cover piece, see FIG. 7. After the cover piece is in place, a suitable filler F is injected into the interior of the cover piece thereby embedding therein the clip 13, shield piece 16, and terminal lip 12.

The improved connector 10 is of simple, inexpensive and compact construction and may be readily assembled with a conventional terminal. Furthermore, the improved connector may be readily utilized safely and effectively in high-voltage circuits.

The configuration and size of the various components comprising the improved connector may be readily varied, if desired, without departing from the scope of the invention herein disclosed.

I claim:

1. An electrical connector for use with a surface mounted terminal in a high voltage circuit, the terminal having a recess provided with an inwardly projecting lip delimiting an entry to the recess, said connector comprising a clip of electrically conductive material and having a pair of elongated protruding elements connected at one end by a bail section, the opposite end portions of said elements being free and adapted to extend into the terminal recess entry and resiliently engage and interlock with the terminal lip; an insulated electrical lead having an end portion thereof straddled by the coaction of said bail section and adjacent portions of said protruding elements, a distal first segment of the lead end portion extending in one direction from said bail section and being in electrical contact with and secured to a segment of the clip projecting from said bail section and being transversely disposed relative to said protruding elements, a second segment of the lead end portion extending in a second direction away from said bail section; an insulated cover piece accommodating said clip and the lead end portion and supportingly engaging the first and second segments of the lead end portion, said cover piece having a section thereof encompassing the clip protruding elements and being adapted to overlie a portion of the surface circumjacent the terminal; and a filler of adhesive rubberlike insulative material disposed in the interior of said cover piece and embedding therein said clip and at least the distal first segment of the lead end portion connected to said clip segment, said filler being adapted to embed therein the terminal lip when engaged by the clip protruding elements.

2. The electrical connector of claim 1 wherein the cover piece includes outer and inner sections, the interior of said outer section being provided with a cavity in which the clip bail section and the adjacent portions of the protruding elements connected thereto are accommodated, a pocket extending laterally from the cavity and supportingly accommodating the clip segment and the lead end portion first segment connected thereto and an opening spaced from said pocket and communicating with said cavity and supportingly accommodating the lead end portion second segment; and said inner section having a skirtlike configuration encompassing said clip protruding elements and being adapted to overlie the portion of the surface circumjacent the terminal.

3. The electrical connector of claim 2 wherein a portion of the filler is adapted to be disposed intermediate the cover piece inner section and the surface circumjacent said terminal.

4. The electrical connector of claim 2 wherein the cover piece outer section is provided with a port for injecting said filler into the interior of said cover piece subsequent to the clip engaging the terminal lip.

5. The electrical connector of claim 2 wherein the clip segment is an elongated tonguelike member; the pocket and opening formed in the cover piece outer section being disposed on substantially opposite sides of said cavity.

6. The electrical connector and terminal combination of claim 2 wherein the cover piece outer and inner sections form a low profile with respect to the surface on which the terminal is mounted.

7. The electrical connector of claim 2 wherein distal ends of the protruding elements extend through at least one opening formed in an enlarged shield piece, said opening permitting relative movement of said distal ends towards and away from each other, said shield piece being enclosed within said cover piece and being adapted to substantially overlie the exposed portion of the surface mounted terminal.

* * * * *